(12) United States Patent
Schechtel et al.

(10) Patent No.: US 7,577,467 B2
(45) Date of Patent: Aug. 18, 2009

(54) SLIDING ELECTRONIC DEVICE ASSEMBLY

(75) Inventors: Kevin Schechtel, Algonquin, IL (US); Jon Godston, Chicago, IL (US); Mark Oliver, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 275 days.

(21) Appl. No.: 11/565,371

(22) Filed: Nov. 30, 2006

(65) Prior Publication Data
US 2008/0132302 A1    Jun. 5, 2008

(51) Int. Cl.
*H04M 1/00* (2006.01)
(52) U.S. Cl. ............... 455/575.4; 455/575.1; 455/550.1
(58) Field of Classification Search ............ 455/550.1, 455/575.1, 575.4, 90.3, 575.2, 575.3, 556.2; 379/433.01, 433.12, 433.11
See application file for complete search history.

(56) References Cited

U.S. PATENT DOCUMENTS

| | | | |
|---|---|---|---|
| 5,151,946 A * | 9/1992 | Martensson | 455/575.4 |
| 6,947,778 B2 | 9/2005 | Tsai | |
| 6,950,316 B2 | 9/2005 | Pan et al. | |
| 6,973,186 B2 * | 12/2005 | Shin | 379/433.12 |
| 6,980,840 B2 * | 12/2005 | Kim et al. | 455/575.4 |
| 6,993,128 B2 * | 1/2006 | Eromaki | 379/433.12 |
| 7,136,688 B2 * | 11/2006 | Jung et al. | 455/575.4 |
| 7,162,283 B2 * | 1/2007 | Bae et al. | 455/575.4 |
| 7,184,806 B2 * | 2/2007 | Bae | 455/575.4 |
| 7,245,949 B2 * | 7/2007 | Kim et al. | 455/575.4 |
| 7,257,432 B2 * | 8/2007 | Nan | 455/575.4 |
| 7,286,862 B2 * | 10/2007 | Lee et al. | 455/575.4 |
| 7,438,486 B2 * | 10/2008 | Ho | 396/448 |
| 2003/0003962 A1 * | 1/2003 | Vooi-Kia et al. | 455/566 |
| 2005/0164751 A1 | 7/2005 | Nishihara | |
| 2005/0164753 A1 | 7/2005 | Kato | |
| 2005/0250563 A1 | 11/2005 | Nan | |
| 2006/0046783 A1 | 3/2006 | Bae | |
| 2006/0068859 A1 | 3/2006 | Lee et al. | |
| 2006/0176654 A1 | 8/2006 | Kfoury | |

OTHER PUBLICATIONS http://www.oqo.com/hardware/specs/.

* cited by examiner

*Primary Examiner*—Sonny Trinh
(74) *Attorney, Agent, or Firm*—Phillip H. Burrus, IV; Lawrence J. Chapa

(57) ABSTRACT

A drive mechanism (101) for a portable electronic device (102), such as a mobile telephone or personal digital assistant, includes at least one wheel (113) engaging at least one track (103). In one embodiment, two tracks (103,104) are coupled to a first housing (105), while a pair of wheels (113,114) are coupled to a shaft (106) which is coupled to a second housing (107) by way of a shaft retaining member (111). The wheels (113,114), which may include wheel teeth (224,225) disposed about the perimeter (226,227) of the wheels that engage track teeth (112), pass along the tracks (103,104) to cause the first housing (105) to slide open or closed relative to the second housing (107). A preloaded tensioning device (108), which in one embodiment comprises to oppositely wound coiled springs disposed concentrically about the shaft (106) bias the first housing (105) and the second housing (107) towards an open position.

20 Claims, 4 Drawing Sheets

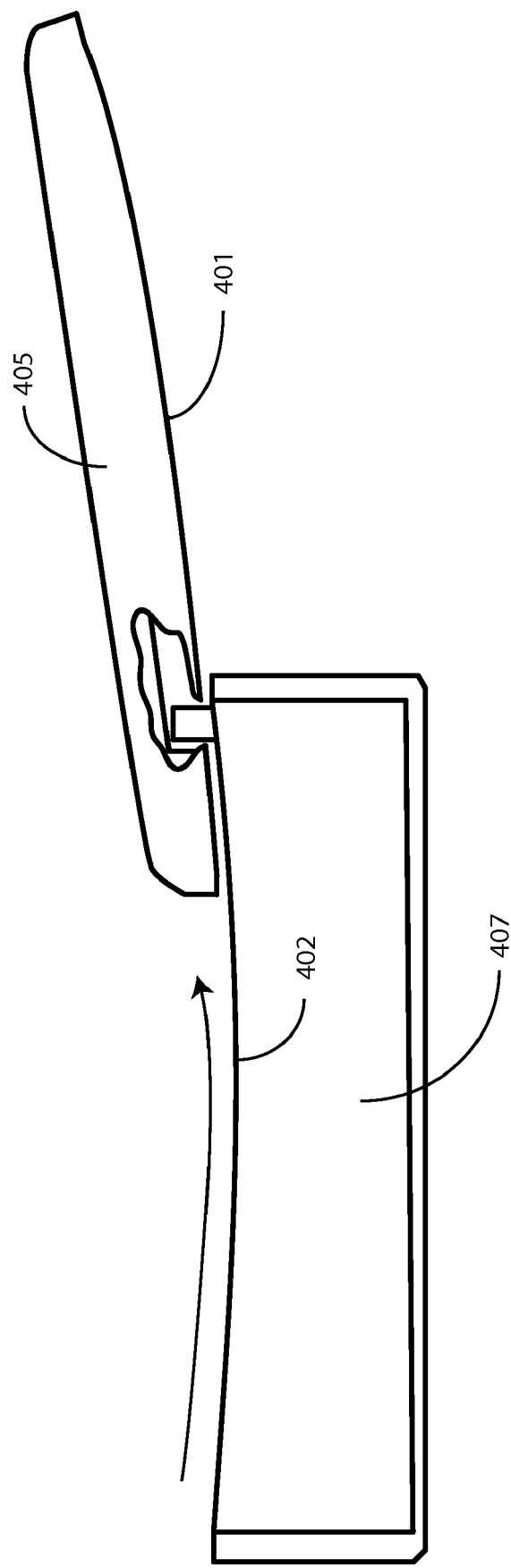

SLIDING ELECTRONIC DEVICE ASSEMBLY

BACKGROUND

1. Technical Field

This invention relates generally to a sliding assembly for a portable electronic device, and more specifically to a track and wheel sliding assembly engaging two halves of a portable electronic device.

2. Background Art

Portable electronic devices, such as mobile telephones for example, have become increasingly popular. According to the CTIA, nearly 220 million people use mobile telephones in the United States alone.

Traditional electronic devices come in different styles, two of which include the "candy bar" and "flip." A candy bar style device is generally rectangular in shape with both keypad and display visible and accessible at all times. A flip style device generally includes a mechanical hinge between the two halves of the device. When the flip style device is closed, keypad and display are generally inaccessible.

In the world of mobile telephones, some consumers prefer the candy bar style phone due to its ease of use. When an incoming call is pending, a candy bar phone may be retrieved from a pocket and answered with a single hand, as the keypad is always exposed. The candy bar device suffers from two limitations, however. One limitation of the candy bar phone is that the keypad may become scratched and damaged due to their constant exposure. A second limitation is that the buttons may accidentally be pressed when in a pocket or purse if they are not first "locked," which is sometimes accomplished by pressing a sequence of buttons.

Flip style devices solve some of these problems. Flip phones keep the keypad and display protected when not in use. As such, the keypad and display are not as easily damaged as with candy bar phones. Further, the buttons generally cannot be inadvertently pressed. However, flip phones also have limitations. One such limitation is that the display size in a flip phone is typically limited to only half of the overall size of the phone, as the hinge is generally located in the middle of the open phone.

Device manufacturers have alternatively introduced sliding phones, having two housing portions where one housing portion of the device slides away relative to the other. However, traditional sliding mechanisms have associated concerns. First, the amount of slide is generally limited. Traditional sliding devices require as much as twenty to thirty millimeters of travel distance overlap, which results in a larger overall product. Where a mobile telephone is approximately 50 mm wide, this travel distance overlap can sometimes leave insufficient room for a QWERTY keypad. Second, traditional sliding mechanisms often bind when the two halves of the device are not pushed together properly. This binding occurs when one side of the sliding mechanism is closed more rapidly than the other. Despite these concerns, sliding phones remain a popular choice among consumers.

There is thus a need for an improved sliding mechanism and associated device that both allows significant slide travel with minimal part overlap and reduces binding when the two housing portions of the sliding device move relative to each other.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 4 illustrates an electronic device having a curved mating surface contour suitable for use with a sliding assembly in accordance with embodiments of the invention.

Figure 1:
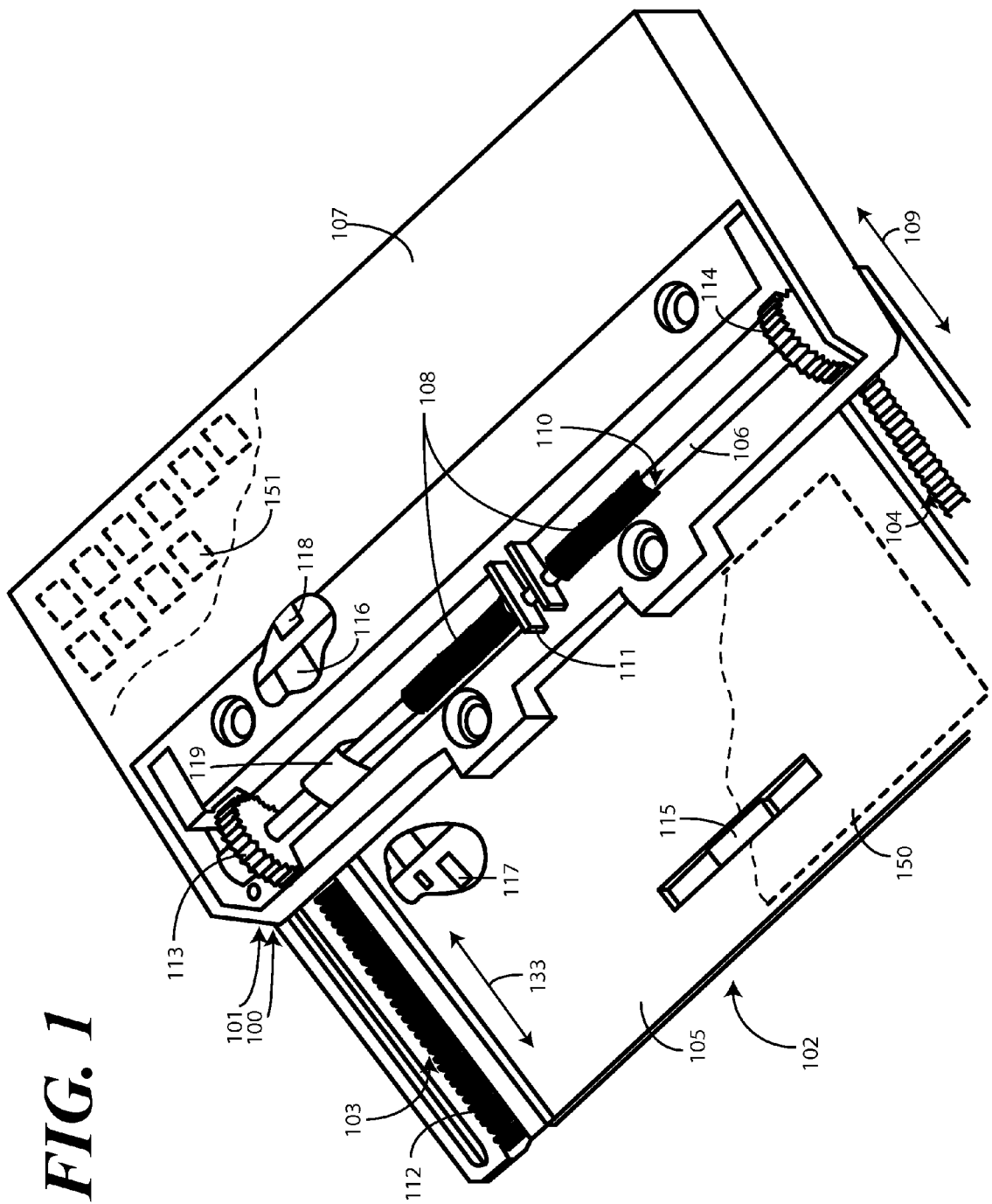
FIG. 1 illustrates a cutaway view of a sliding electronic device having a first half and a second half, the electronic device employing a sliding assembly in accordance with one embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Reference designators shown herein in parenthesis indicate components shown in a figure other than the one in discussion. For example, talking about a device (10) while discussing figure A would refer to an element, 10, shown in figure other than figure A.

As illustrated and described herein, a sliding electronic device has a first half and a second half that at least partially separate from each other by sliding. The sliding action occurs when each half translates independently along at least one direction relative to the other. In one embodiment, the sliding electronic device is a mobile telephone or personal digital assistant. In such an embodiment, the sliding mechanism is designed to allow automatic movement of a cover having a display disposed thereon across a second half to which it is attached, thereby exposing either a numeric or "QWERTY" keypad.

In one embodiment, the sliding assembly includes at least one wheel fixedly coupled to a shaft. The shaft is secured in the main body of the electronic device by a shaft retaining member. In one embodiment, the shaft retaining member comprises two small metal plates, and two coil springs are wrapped about the shaft. One end of each coil spring is secured and affixed to the shaft. The other end of each coil spring is secured to the two plates.

In one embodiment of the invention, the springs are configured such that the coils, and thus the preloaded bias force exerted by each spring, are in opposite positions. In such a configuration, when the shaft assembly is rotated, one spring winds (or contracts) about the shaft. The other spring unwinds (or expands) about the shaft. This oppositely wound configuration offers an advantage in that the rotational torque applied by each spring is equalized about a center portion of the shaft. This equalization balances forces applied to the shaft, thereby reducing loading on the shaft and allowing for less friction. In such a configuration, smaller retention features may be used to couple the shaft to the device. The sliding assembly in such a configuration is able to open automatically through the release of the stored potential energy in the springs.

The sliding assembly engages the other half of the electronic device, in one embodiment, by way of a track. This track may include teeth to engage complimentary teeth on the wheels or pinions coupled to the shaft. Track teeth (or frictional forces where teeth are not employed) work to cause a sliding action between the two halves of the electronic device along one or more axes, while permitting free movement in another axis.

The two halves of the device may be held in a closed position by a latch or magnetic locking mechanism. When using the magnetic locking mechanism, the sliding assembly is restrained when a magnetic device in a first half of the electronic device meets a magnetic element or magnetically conductive element in the second half. A user is then able to open the device by using fingers apply a force sufficient to overcome the magnetic field force, thereby allowing the springs to convert their stored energy into kinetic energy. In the case of a mobile telephone or personal digital assistant, the two halves then slide apart, thereby exposing a keypad.

Embodiments of the invention resolve several problematic issues associated with prior art sliding designs. A first issue that is resolved is the excessive part overlap required in prior art sliding assemblies. Typical prior art assemblies require that the first half of the electronic device overlap the second (when the two halves are slid to the open position) by approximately 22 to 30 millimeters. Embodiments of the present invention reduce this required overlap to 10 to 15 millimeters, thereby allowing designers to make smaller devices with equivalently large displays and keypads.

A second issue that is resolved is that of binding or "racking" when the two halves of the electronic device are slid from an open position to a closed position or vice versa. Such binding typically occurs when the device is slid from an open position to a closed position, with the user pushing the two halves together by applying a force in an off-center location. When this occurs, one side of the device tries to close faster than the other, thereby creating a binding effect. The sliding assembly of one embodiment of the invention, where the wheels are disposed at the ends of the shaft and include teeth and the track includes corresponding teeth, ensures that the sliding assembly moves smoothly and evenly to the closed position. This wheel configuration operates to minimize or eliminate a canting effect that can occur when one edge of a sliding member is allowed to move faster than the other, thereby causing binding.

A third issue that is resolved by embodiments of the invention is that geometric freedom. Typical prior art designs require that the mating surfaces of the two halves of the electronic device be flat, planar, and smooth. Embodiments of the present invention, however, eliminate this limitation, as the mating surfaces can be curved or otherwise non-linear. Thus, embodiments of the invention can be adapted to accommodate both curved and planar slide applications.

A fourth issue that is resolved by embodiments of the invention is that of ease of opening. While prior art sliding assemblies require two hands to open the device, embodiments of this invention allow the sliding assembly to be opened with one hand.

Figure 2:
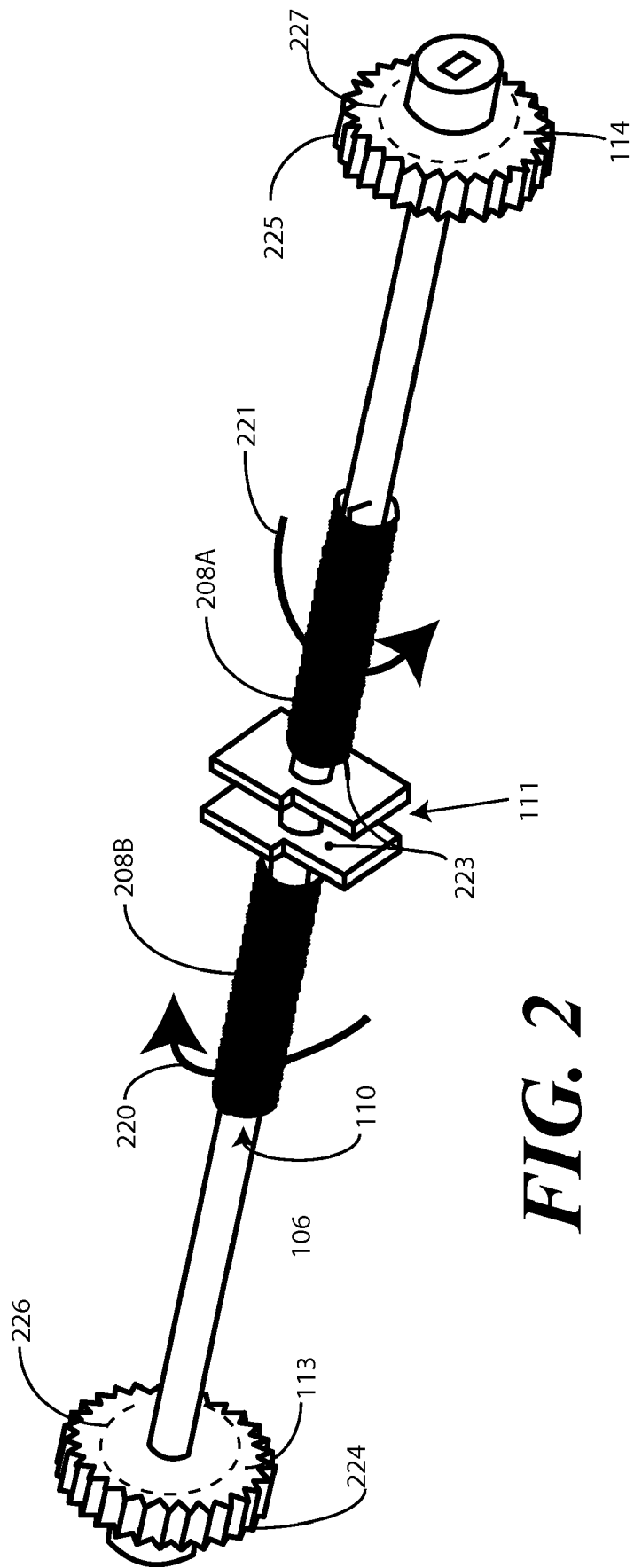
FIG. 2 illustrates one portion of a sliding assembly in accordance with one embodiment of the invention.

Turning now to FIGS. 1 and 2, illustrated therein is a cut-away view of a portable electronic device 102 that includes a drive mechanism 101 in accordance with embodiments of the invention. FIG. 1 illustrates the drive mechanism 101 exposed due to the cutaway section of the second half 107 of the device 102. The view of FIG. 1 is shown looking at the bottom of the device 102. FIG. 2 illustrates components of the drive mechanism 101 that have been removed from the device 102 so as to be seen more clearly.

The drive mechanism 101 includes at least two tracks 103, 104. The tracks 103,104 are coupled to, which may include being integrally formed with, the first housing 105, or first half, of the device 102. Note that while the word "half" is used herein to describe the housing parts, it should not be construed as meaning that the housing parts should be substantially similar is size or dimension. Design choices may dictate that one half housing is thicker, longer, or wider than another.

As shown in FIG. 1, in one embodiment the tracks 103,104 are disposed generally towards the outer regions of the first housing 105, so as to be located generally on the outer edges. Such a configuration is advantageous in that the tracks 103, 104 being disposed on the outside helps to cause each edge to move at a constant rate, thereby minimizing binding or canting. It will be clear to those of ordinary skill in the art having benefit of this disclosure, however, that the locations of the tracks 103,104 could be moved as dictated by a particular design or application while substantially providing the intended performance. Similarly, the widths of the tracks 103,104 may be adjusted to suit a particular application.

A shaft 106, disposed within the second housing 107 and coupled to the second housing 107, is coupled to two wheels 113,114. The drive mechanism may employ only one wheel. For example, rather than having two wheels 113,114 coupled to the shaft 106, a single wheel may be coupled in a central location of the shaft. Similarly, a single, wide wheel can be coupled along a substantive portion of the shaft. Where two wheels are employed, the shaft 106 separates the two wheels 113,114 such that the wheels 113,114 are aligned with the tracks 103,104 so as to engage the separated tracks 103,104 when the first housing 105 is coupled to the second housing 107. The shaft 106 is generally manufactured from a rigid plastic. Alternatively, the shaft may be manufactured from metal.

The shaft 106 is coupled to the second housing 107 by at least one shaft retaining member 111. The shaft retaining member 111 is disposed about the shaft 106 such that the shaft 106 is capable of rotating easily within the confines of the shaft retaining member 111. While the shaft retaining member 111 can be manufactured from plastic, in one embodiment the shaft retaining member comprises one or more metal plates. While the shaft retaining member 111 is shown in FIGS. 1 and 2 as being located in the center of the shaft, the shaft retaining member 111 could also be disposed in an off-center location relative to the length of the shaft 106.

At least one preloaded tensioning device 108 is coupled to the shaft 106. In one embodiment, the preloaded tensioning device 108 comprises a coil spring that is wound about the shaft 106 and is coupled to the shaft 106 distally 110 along the shaft 106. This distal coupling allows the coiled spring to create a torsion force to the shaft 106, thereby biasing the first housing 105 and the second housing 107 toward the open position. In this embodiment, the other end of the preloaded tensioning device 108 is coupled to the shaft retaining member 111 at points 223.

Where the preloaded tensioning device is a coiled spring disposed concentrically about the shaft, the coil spring is wound so as to bias the first housing 105 and the second housing 107 toward an open position. When the first housing 105 and second housing 107 are pushed together, i.e. when they are closed, the preloaded tensioning device 108 stores additional energy. When the first housing 105 and second housing 107 are opened, the preloaded tensioning device 108 releases this additional stored energy as kinetic energy, thereby opening the device 102.

In one embodiment, mentioned briefly above, the preloaded tensioning device 108 comprises two coiled springs 208A,208B each of which is disposed concentrically about the shaft 106. In one embodiment employing the two coiled springs 208A,208B, the two coiled springs 208A,208B are coiled in opposite directions 220,221 about the shaft. Each is coiled so as to bias the first housing 105 and the second housing 107 in an open position. Experimental testing has shown, however, that by coiling the springs 208A,208B in opposite directions, the resulting moment created by each spring's biasing force is reduced in a lateral direction relative to the shaft's position with respect to the tracks 103,104. Said differently, where the springs 208A,208B are coiled in the same direction, the springs' biasing forces create a moment that works to move the shaft in a lateral direction. This moment limits the degrees of freedom for the designer of the electronic device 102, as the moment generated can limit the choice of materials or component dimensions. While springs coiled in the same direction do work, the moment is reduced by coiling the springs 208A,208B in opposite directions about the shaft 106. The reduction in moment offers the designer more degrees of freedom in designing the overall device 102.

In one embodiment, the wheels 113,114 engage the tracks 103,104 by way of frictional forces only. For example, where the tracks 103,104 are constructed of rigid plastic, and the wheels 113,114 are constructed of rubber, friction between the wheels 113,114 and the tracks 103,104 allow the force of the springs 208A,208B to be translated so as to open the first housing 105 from the second housing 107.

In the embodiment shown in FIGS. 1 and 2, the tracks 103,104 engage the wheels 113,114 by geared teeth 112. Specifically, in this embodiment, the tracks 103,104 comprise a plurality of track teeth 112 disposed along a length 133 of each of the tracks 103,104. The wheels 113,114 each comprise a plurality of wheel teeth 224,225 disposed along perimeter 226,227 of each of the wheels 113,114. The track teeth 112 engage the wheel teeth 224,225 so as to cause the first housing 105 and second housing 107 to open and close. Not only do the track teeth 112 and the wheel teeth 224,225 help to engage the tracks 103,104 with the wheels 113,114, but they also help to reduce canting and binding by facilitating uniform translation between each side of the housings 105, 107 of the device 102.

In one embodiment of FIG. 1, the first housing 105 includes a retaining device 115 that is configured to oppose the preloaded tensioning device 108 so as to retain the first housing 105 and the second housing 107 in a closed position. Said differently, when the first housing 105 is slid to a closed position relative to the second housing 107, thereby causing the preloaded tensioning device 108 to store energy, the retaining device 115 retains the first housing 105 and second housing 107 in a closed position until an additional force is applied by a user, thereby overcoming the holding force of the retaining device.

In one embodiment, the retaining device 115 comprises a magnetic coupling. The magnetic coupling may include a magnet disposed in one housing with a magnetically conductive member in the other housing. Similarly, the magnetic coupling may include a pair of magnets or an electromagnetic coupling that is activated when the two housings are closed. In another embodiment, the retaining device 115 comprises a latch and hook assembly, with a latch on one housing engaging a hook on the other housing when each housing is closed. Such a latch and hook assembly could be releasable by way of a user actuated push button. It will be clear to those of ordinary skill in the art having the benefit of this disclosure that other retaining devices could be employed without departing from the spirit and scope of embodiments of the present invention.

Where the electronic device 102 is a mobile telephone, personal digital assistant, or other similar device, electrical components and circuits may be disposed in both the first housing 105 and second housing 107. For example, a display 150 may be disposed in the first housing 105, while a keypad 151 is disposed in the second housing 107. There thus may be a need to make electrical connections between circuits in the first housing 105 and circuits in the second housing 107. The drive mechanism 101 of the present invention accommodates such a connection, which can be easily made about the shaft 106.

Specifically, a flexible electrical conductor 116 may be used to couple circuits in the first housing 105 to circuits in the second housing 107. By way of example, a flexible electrical conductor 116, such as a ribbon cable or flexible substrate, may be used to couple a circuit 117 disposed in the first housing 105 with a circuit 118 disposed in the second housing 107. To prolong the life of the flexible electrical conductor 116, and to ease in opening and closing the device 102, a service loop 119 may be included in the design of the flexible electrical conductor 116. The service loop 119 passes about the shaft 106, thereby eliminating strain on the flexible electrical conductor 116. One suitable flexible substrate for use as the flexible electrical conductor 116 is copper conductors encapsulated in a durable.

To recap, the drive mechanism 101, with its preloaded tensioning device 108, serves as an automatic opening mechanism 100 for the electronic device 102 and its corresponding two part housing. The drive mechanism 101, operating as a sliding engagement, is disposed between the first housing 105 and the second housing 107 and includes at least one track 103 coupled to the first housing 105, at least one wheel 113 engaging the at least one track 103. The at least one wheel 113 is coupled to a shaft 106, which is coupled to the second housing 107 by a shaft retaining member 111. A preloaded tensioning device 108 is fixedly coupled to either the second housing 107 or the shaft retaining member 111 at a first end, and is coupled to the shaft 106 at the second end so as to bias the two part housing towards an open position. In one embodiment, the electronic device comprises a two-way communication device, such as a mobile telephone or personal digital assistant, having a display 150 disposed in the first housing 105 and a keypad 151 disposed in the second housing 107.

Figure 3:
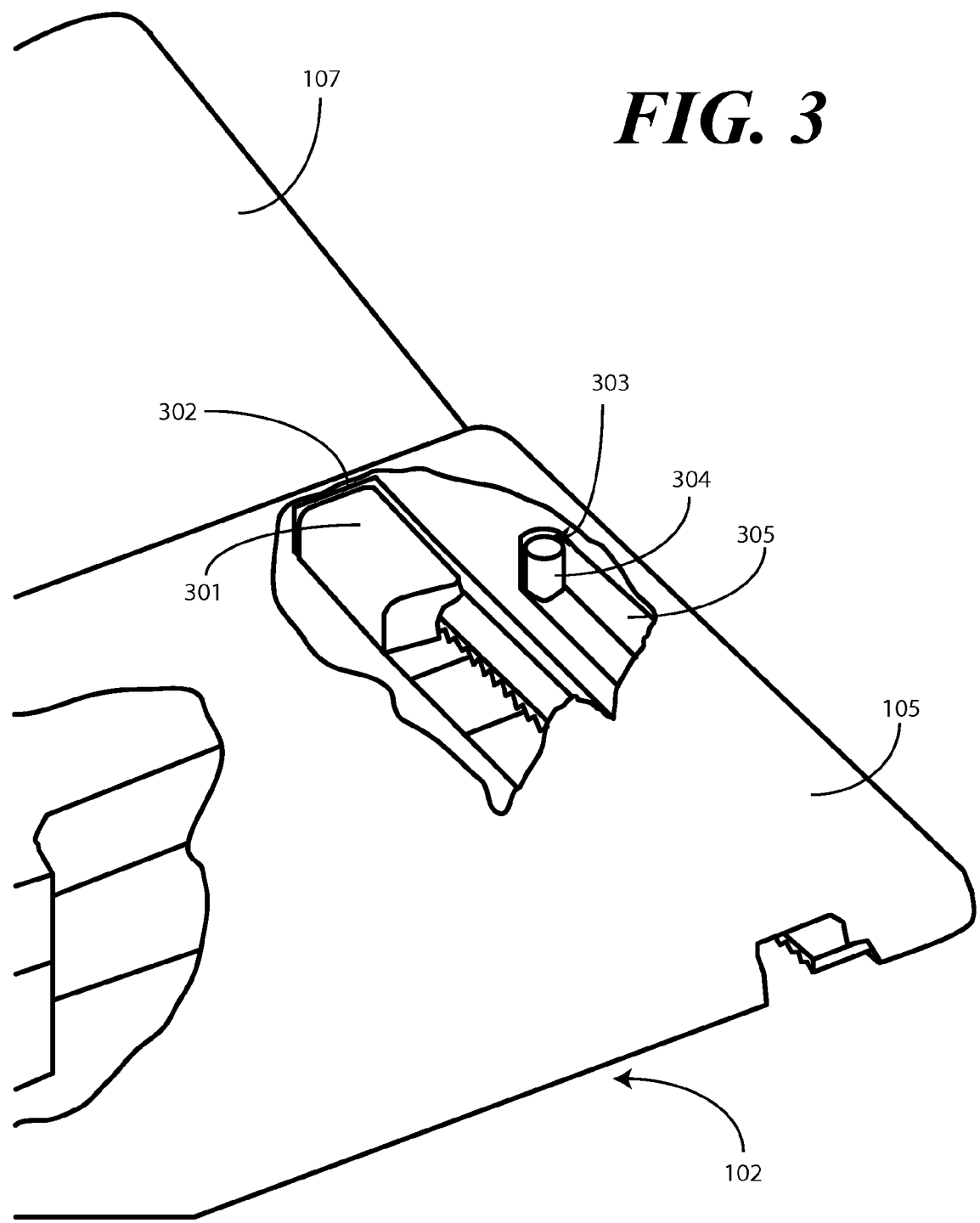
FIG. 3 illustrates elements of a sliding assembly for use in an electronic device in accordance with embodiments of the invention.

Turning now to FIG. 3, illustrated therein is a cut-away view of an electronic device 102, where additional components related to the drive mechanism (101) can be seen. As shown in FIG. 3, additional components may be optionally used in conjunction with the wheels (113,114), shaft (106), and tracks (103,104). For example, in one embodiment the drive mechanism (101) includes at least one protruding engagement 301 extending from the second housing 107. The protruding engagement 301 serves both to align the first housing 105 with the second housing 107, and to retain the first housing 105 against the second housing 107, thereby assisting in the engagement of the wheels (113,114) with the tracks (103,104). The protruding engagement 301 engages a receiving engagement 302 disposed within the first housing 105.

Additionally, a mechanical stop engagement 303 is included to prohibit the first housing 105 from over extending relative to the second housing 107. In one embodiment, the mechanical stop engagement 303 comprises a metal pin 304 extending from the second housing 107 towards the first housing 105. Other materials, including plastic and polymers, may also be used to manufacture the mechanical stop engagement 303.

The mechanical stop engagement 303 extends into a receiving slot 305 disposed within the first housing 105. When the drive mechanism (101) is causing the first housing 105 to open from the second housing 107, the mechanical stop engagement 303 moves within the receiving slot 305. The opening action is stopped when the mechanical stop engagement 303 reaches the limit (such as a rear wall) of the receiving slot 305.

Turning now to FIG. 4, illustrated therein is an electronic device 400 having a first housing 405 and a second housing 407. The first housing 405 has a curved surface 401, which mates with a corresponding surface 402 on the second housing. The wheel and track sliding engagement of the present invention facilitates such surfaces, as the tracks can be curved. When the wheels move along the tracks, curved tracks, including non-single radius tracks, can be accommodated as the sliding mechanism does not rely on a retention device traveling along a slot. While prior art solutions required flat, planar face surfaces between the two housings, the wheel and track system described above provides designers with additional degrees of freedom in that they may now design geometrically complex mating surfaces between housings.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A drive mechanism for a portable electronic device, comprising
   at least two tracks coupled to a first housing; and
   a shaft coupled to a second housing, the shaft separating and coupled to at least two wheels, the at least two wheels engaging the at least two tracks; and
   a preloaded tensioning device having at least one end coupled to the shaft so as to bias the first housing and the second housing towards an open position.

2. The drive mechanism of claim 1, wherein the preloaded tensioning device comprises at least one spring coupled to an end of the shaft.

3. The drive mechanism of claim 2, wherein the at least one spring comprises at least one coiled spring disposed concentrically about the shaft.

4. The drive mechanism of claim 2, wherein the at least one spring comprises two coiled springs disposed concentrically about the shaft.

5. The drive mechanism of claim 4, wherein the two coiled springs are coiled in opposite directions about the shaft.

6. The drive mechanism of claim 4, wherein the two coiled springs coiled in a same direction about the shaft.

7. The drive mechanism of claim 4, further comprising at least one shaft retaining member disposed about the shaft and coupled to the second housing, wherein the two coiled springs are each fixedly coupled to the at least one shaft retaining member.

8. The drive mechanism of claim 7, wherein the at least one shaft retaining member is disposed in an off-center location relative to a length of the shaft.

9. The drive mechanism of claim 1, wherein the at least two tracks each comprise a plurality of track teeth disposed along a length of each of the at least two tracks.

10. The drive mechanism of claim 9, wherein the at least two wheels each comprise a plurality of wheel teeth disposed along a perimeter of each of the at least two wheels, wherein the plurality of wheel teeth engage the plurality of track teeth.

11. The drive mechanism of claim 1, further comprising at least one protruding engagement extending from the second housing and at least one receiving engagement disposed within the first housing.

12. The drive mechanism of claim 11, further comprising a mechanical stop engagement.

13. The drive mechanism of claim 12, wherein the mechanical stop engagement comprises a pin and a receiving slot.

14. The drive mechanism of claim 1, further comprising a retaining device configured to oppose the preloaded tensioning device so as to retain the first housing and the second housing in a closed position.

15. The drive mechanism of claim 14, wherein the retaining device comprises one of a magnetic coupling or a latch and hook assembly.

16. The drive mechanism of claim 1, wherein at least one of the at least two tracks comprises a non-single radius curvature.

17. The drive mechanism of claim 1, further comprising a flexible electrical conductor coupling a circuit disposed in the first housing with a circuit disposed in the second housing, the flexible electrical conductor comprising a service loop passing about the shaft.

18. An automatic opening mechanism for an electronic device having a two-part housing, comprising a sliding engagement disposed between a first housing and a second housing, the sliding engagement comprising at least one track coupled to the first housing, at least one wheel engaging the at least one track, the at least one wheel coupled to a shaft coupled to the second housing, and a preloaded tensioning device coupled to the shaft so as to bias the two-part housing towards an open position.

19. The automatic opening mechanism of claim 18, wherein the electronic device comprises a two-way communication device comprising a display disposed in the first housing and a keypad disposed in the second housing.

20. The automatic opening mechanism of claim 18, the at least one track is curved.

* * * * *